United States Patent [19]

Burger

[11] 4,236,249
[45] Nov. 25, 1980

[54] CIRCUIT ARRANGEMENT FOR CORRECTING FREQUENCY ERRORS DURING A TRANSMISSION OF DATA

[75] Inventor: Erich Burger, Unterpfaffenhofen, Fed. Rep. of Germany

[73] Assignee: Siemens Aktiengesellschaft, Berlin & Munich, Fed. Rep. of Germany

[21] Appl. No.: 969,729

[22] Filed: Dec. 15, 1978

[30] Foreign Application Priority Data

Jan. 23, 1978 [DE] Fed. Rep. of Germany ....... 2802784

[51] Int. Cl.³ ............................................. H03F 9/10
[52] U.S. Cl. ...................................... 375/79; 375/84; 375/88; 375/97; 455/257
[58] Field of Search ........................... 178/69.1, 67.1; 325/320; 340/170; 128/67; 455/257, 258, 263, 264, 265; 375/79, 84, 88, 97

[56] References Cited

U.S. PATENT DOCUMENTS

| | | | |
|---|---|---|---|
| 3,036,157 | 5/1962 | Franco | 178/67 |
| 3,445,593 | 5/1969 | Greg et al. | 325/320 |
| 3,447,085 | 5/1969 | DeHaas et al. | 178/69.1 |
| 3,456,194 | 7/1969 | Burger | 325/320 |
| 3,485,949 | 12/1969 | DeHaas | 178/67 |
| 3,921,103 | 11/1975 | Burger | 178/67 |
| 3,947,633 | 3/1976 | Burger | 178/67 |

Primary Examiner—Benedict V. Safourek
Attorney, Agent, or Firm—Hill, Van Santen, Steadman, Chiara & Simpson

[57] ABSTRACT

A circuit arrangement is disclosed for correcting frequency errors during a transmission of data by means of data signals which are modulated according to a frequency-differential phase modulation. The circuit arrangement corrects frequency errors which occur during the transmission of the data signals from a data transmitter to a data receiver. The data receiver contains a regulating stage inside which the data signals are converted with the assistance of mixed signals. A repetition frequency of the mixed signals is regulated with the assistance of a first regulating unit performing a fine regulation and a second regulating unit performing a coarse regulation in such a way that frequency errors of the data signals are corrected. A regulator generates the mixed signals from timing pulses of given repetition frequency with the assistance of frequency multipliers. The frequency multipliers are controlled by regulating signals which optionally switch through a selection unit to the regulator from either the first regulating unit or the second regulating unit.

8 Claims, 6 Drawing Figures

CIRCUIT ARRANGEMENT FOR CORRECTING FREQUENCY ERRORS DURING A TRANSMISSION OF DATA

BACKGROUND OF THE INVENTION

The invention relates to a circuit arrangement for correcting frequency errors during a transmission of data by means of data signals which are modulated according to a frequency-differential phase modulation. A regulating stage is provided which generates corrected data signals from the data signals. From the corrected data signals the transmitted data are regained by means of a modulator.

For the transmission of data via short-wave communications, it is already well-known to modulate the data signals according to a frequency-differential phase modulation. This kind of modulation is particularly suitable for short-wave communications, since two transmission channels which are situated side by side differ just slightly from one another not only with regard to the phase shifts but also to the modulation sections. In the case of the frequency-differential phase modulation, the data are, therefore, contained in the phase differences of several data signals which are simultaneously transmitted and have neighboring frequencies. The frequency band containing the frequencies of the data signals is designated as a baseband. The two frequencies limiting the baseband are the reference frequencies. In the data receiver, the data signals together with two mixed signals are converted into two group signals. A demodulator regains the transmitted data from the group signals.

In order to attain a high insensitivity with respect to frequency shifts, a circuit arrangement is necessary for correcting the frequency errors. Special demands are made on this circuit arrangement. The frequency errors relative to the center frequency of the data signals have to be compensated to less than 1 Hz. The circuit arrangement should have a large frequency range, and the regulating range and the regulating speed have to be changeable in a simple manner according to the intended application. Should the received data signals fail, the regulating condition has to be maintained. Further, radio interferences must not affect the regulation and the regulation should be carried out without using pilot signals.

It is already well-known to employ regulating loops for correcting frequency errors. With these regulating loops, in dependence upon regulating signals, the repetition frequency of an oscillator is modified. The oscillator is, for example, a voltage controlled oscillator or a quartz oscillator, at the output side of which a frequency divider having a variable dividing ratio has been connected. A circuit arrangement for correcting frequency errors in the presence of a frequency-differential phase modulation, which meets the aforesaid requirements, is hitherto not known.

SUMMARY OF THE INVENTION

Therefore, it is an object of the invention to provide a circuit arrangement for correcting frequency errors during a transmission of data by using frequency-differential phase modulation which will have great accuracy.

This object is realized in accordance with the invention in the case of the circuit arrangement of the kind referred to above by a modulator which generates group signals by converting the data signals with mixing signals. The group signals represent the corrected data signals. A first regulating unit generates fine regulating signals from the group signals if the frequency error of the mixing signals is smaller than a given quantity. A second regulating unit generates coarse regulating signals from the group signals if the frequency error is larger than the given quantity. A selection stage, in dependence upon the magnitude of the frequency error, generates regulating signals from the fine regulating signals and the coarse regulating signals. A regulator, in dependence upon the regulating signals, generates the mixing signals from timing pulses of a given repetition frequency.

The circuit arrangement in accordance with the invention has the advantage that by using the first regulating unit, frequency errors which are still very small are detected and compensated. The circuit arrangement has a wide pull-in range as a result of the second regulating unit. Due to the use of integrated digital circuits, the circuit arrangement involves very little expense and, in a simple manner, it can be adapted to the intended application is required. No regulating signals are generated during an interruption of the data signals, and the repetition frequencies of the mixed signals are maintained until regulating signals occur again.

An advantageous development of the circuit arrangement is achieved when the first regulating unit contains a first frequency divider which divides the repetition frequency of the group signals by a given factor and which generates measuring signals, and contains a second frequency divider which is always released during the period of time fixed by the measuring signals and which divides the repetition frequency of the timing pulses by a given factor and which generates control signals. Preferably the first regulating unit contains a counter, which, in dependence upon the control signals, is counted upwards or downwards and which generates the fine regulating signals when attaining the given values. In order to ensure that the measuring signals occur only at such points of time at which the group signals are produced, it is advantageous to have the first regulating unit contain a phase detector which, during every change of phase of the group signals, resets the frequency dividers.

The criterion for the coarse regulation is produced in a simple manner when the second regulating unit contains two discriminators which generate signals having first and/or second binary values and when the frequencies of the group signals are situated inside and/or outside a given frequency range. Preferably a coder is also provided which generates the coarse regulating signals from the signals generated from the discriminators.

In order to be able to examine in a simple manner the quality of the received data signals, it is advantageous to have the second regulating stage contain a frequency divider which is stepped by timing pulses of low repetition frequency, and which is reset with every modification of the signals emitted from the discriminators, and which emits blocking signals to the coder.

For the generation of group signals it is favorable to have the regulator contain a first and a second frequency multiplier, which, in dependence upon the output signals emitted from a counter, divide the repetition frequency of the timing pulses by variable dividing factors and which generate the mixing signals. The output signals are fed to the first frequency multiplier directly and to the second frequency multiplier via an adder which subtracts a constant binary number from the binary number represented each time by the output signals. The regulator contains a coder which, in dependence upon the regulating signals, counts the counter upwards and downwards.

For the elimination of momentary fluctuations it is advantageous to have a frequency divider that is connected at the output side of every frequency multiplier and which divides the repetition frequencies of the mixing signals each time by a given dividing factor.

BRIEF DESCRIPTION OF THE DRAWINGS

FIG. 6 illustrates a circuit diagram of a selection stage and a regulator.

DESCRIPTION OF THE PREFERRED EMBODIMENTS

Figure 1:
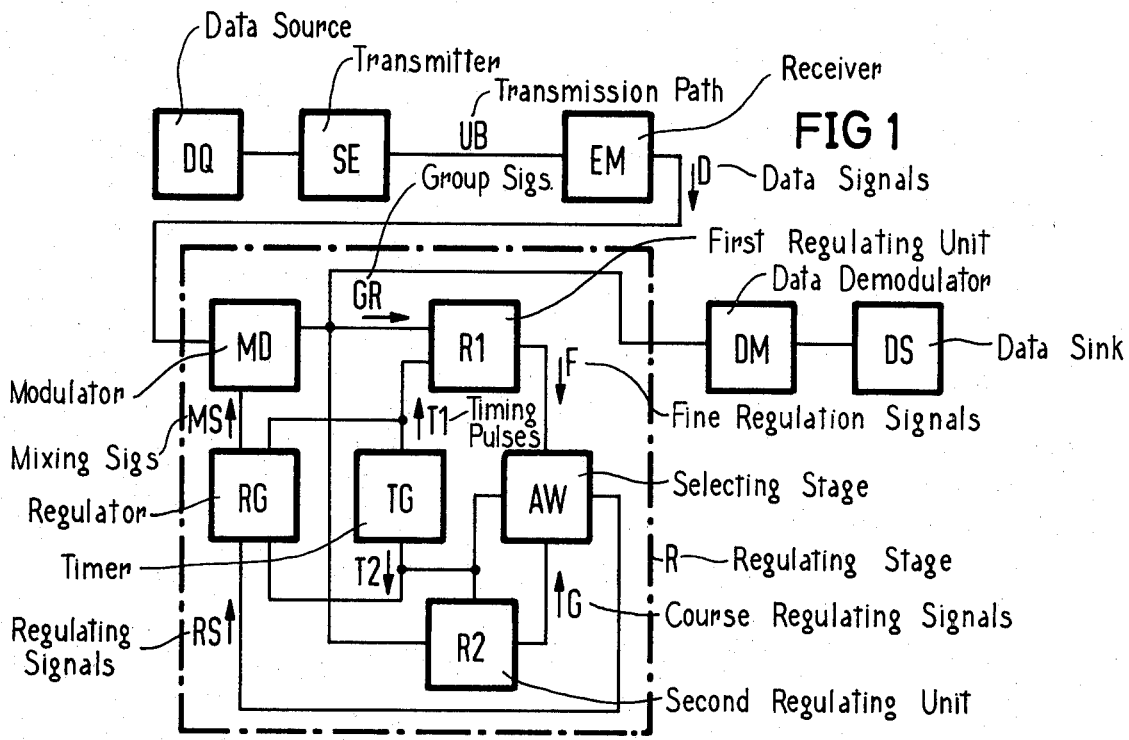
FIG. 1 illustrates a block diagram of an arrangement for the transmission of data.

In the case of the circuit arrangement illustrated in FIG. 1, a data source DQ, with which a data transmitter has been provided, generates data and emits these to a transmitter SE. The transmitter SE generates data signals and transmits these via a transmission path UB to a data receiver. The data signals are modulated in a known manner according to a frequency-differential phase modulation. The data receiver contains a receiver EM which converts the data signals transmitted via the transmission path UB into data signals D suitable for further processing. The frequencies of the data signals D are situated, for example, within the voice band in the range between 1040 and 2400 Hz. Therefore, the data signals D are also designated as baseband signals. The data signals D are applied to a regulating stage R, in which the data signals D are modulated with mixing signals MS and the group signals GR are generated, from which a demodulator DM regains the transmitted data and emits them to a data sink DS.

The regulating stage R contains a first regulating unit R1 which generates fine regulating signals F from timing pulses T1 of high repetition frequency. With the fine regulating signals a fine regulation of the repetition frequency of the mixed signals MS takes place. Further, the regulating stage R contains a second regulating unit R2, which generates coarse regulating signals G from the group signals GR and timing pulses T2 of low repetition frequency, with which coarse regulating signals a coarse regulation of the mixing signals MS is carried out. Via a selection stage AW, the fine regulating signals F and the coarse regulating signals G are optionally fed to a regulator RG, which, in dependence upon the deviation of the repetition frequency of the mixing signals M, compensates the deviations from a nominal frequency either with the assistance of the fine regulating signals F or the coarse regulating signals G.

Figure 2:
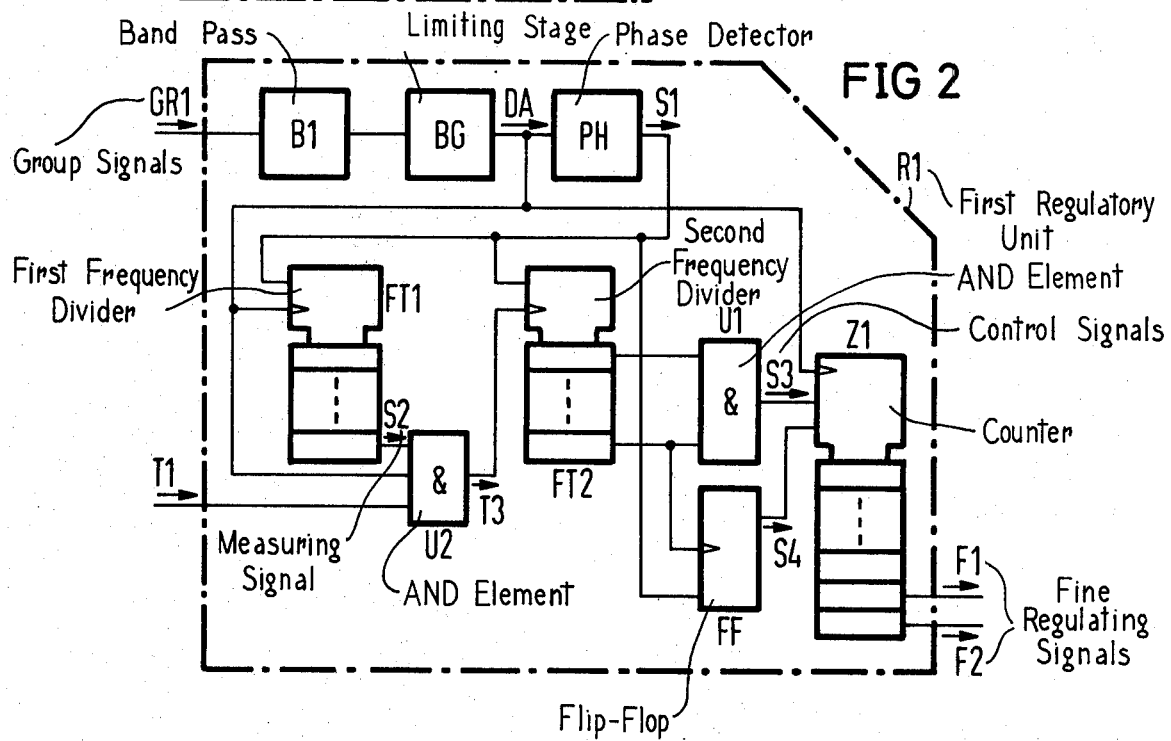
FIG. 2 illustrates a circuit diagram of a first regulating unit.

The regulating unit R1 illustrated in FIG. 2 contains a band pass B1, a limiting stage BG, a phase detector PH, two frequency dividers FT1 and FT2, a counter Z1, a flip-flop FF and two AND elements U1 and U2.

Further details of the regulating unit 1 will be described together with the time diagrams illustrated in FIG. 3.

Figure 3:
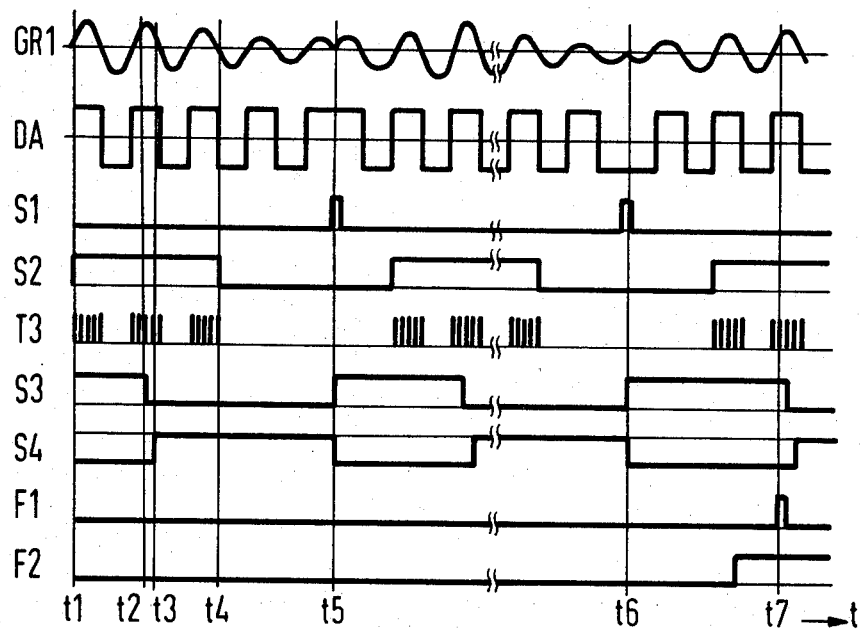
FIG. 3 illustrates a time diagram of signals at different points of the first regulating unit.

In the case of the time diagrams illustrated in FIG. 3, the time T is shown in the direction of the abscissa and the instantaneous values of signals at various points of the regulating unit R1 in the direction of the ordinate. The modulator MD generates the group signals GR1 and GR2 by converting the data signals D. The group signals GR1 are applied to the band pass B1. The band pass has a center frequency of 4160 Hz and a band width of 40 Hz. The group signals GR1 have frequencies in the range from 3520 Hz to 4160 Hz. The signals at the output of the band pass B1 are fed to the limiter BG, which amplifies and limits the signals and emits the data signals DA. These data signals DA are applied, on the one hand, to a phase detector Ph which detects phase jumps in the data signals DA, and, on the other hand, to the timing inputs of a frequency divider FT1 designed as a counter and a counter Z1 designed as a bidirectional counter. The frequency divider FT1 divides the repetition frequency of the data signals DA by the factor 64 and emits measuring signals S2 at its output. At its output, the phase detector PH emits signals S1, which reset the frequency dividers FT1 and FT2 as well as the flip-flop FF.

The group signal GR1 assumes a positive value at the point of time t1. Simultaneously, the data signal DA assumes the binary value 1. As an example, on the assumption that the measuring signal S2 has likewise the binary value 1, the AND element U2 emits timing pulses T3, the repetition frequency of which corresponds to the repetition frequency of the timing pulses T1 of 3.9936 MHz. The timing pulses T3 are applied to the timing input of the frequency divider FT2 designed as a counter, which divides the repetition frequency by the dividing factor 30720. At the output side of the frequency divider FT2, the AND element U1 is connected, which emits the signals S3 with the binary value 1 at such a time when the counts of the frequency divider FT2 correspond to a repetition frequency of the group signals GR1, which is larger than 4176 Hz and smaller than 4144 Hz. When the signal S3 assumes the binary value 1, the counter Z1 is always blocked. Thus it is avoided that the regulating unit R1 emits a fine regulating signal when the repetition frequency of the group signals GR1 deviates by more than ±16 Hz from the nominal frequency of 4160 Hz. The signal S3 assumes the binary value 0 at the point of time t2.

The signal at the output of the frequency divider FT2, which output has the highest value, is applied to the timing input of the flip-flop FF. The flip-flop FF emits the signal S4 which determines the direction in which the counter Z1 counts. The signal S4 assumes the binary value 1 at the point of time t3 and causes the counter Z1 to count upwards, whereas it was counted downwards until the point in time t3.

The measuring signal S2 assumes the binary value 0 at the point of time t4. Thus, the AND element U2 no longer emits timing pulses T3. The counter Z1 has attained a given count depending upon the fact whether more timing pulses have occurred, while the counter was counting downwards or upwards. It is assumed, for example, that at the point of time t4, the counter Z1 has attained a count which is larger than half of its counting range.

A phase jump of 180° occurs in the group signal GR1 at the point of time t5. The phase detector Ph detects the phase jump and generates a pulse S1 which resets the frequency dividers FT1 and FT2 and the flip-flop FF. Subsequently, similar processes, such as between the points of time t1 and t5, are repeated between the points of time t5 and t6. It is assumed that between the points of time t5 and t6 more timing pulses T3 have occurred which count the counter Z1 upwards, than of a kind which count the counter downwards. Similar processes are repeated after the point of time t6. Again, more timing pulses T3 occur which count the counter Z1 upwards, so that the counter Z1 attains its largest count at the point of time t7 and generates a carry signal. The counter Z1 emits this carry signal as fine regulating signal F1 via the selection stage AW as regulating signal RS to the regulator RG. Moreover, the counter Z1 emits a fine regulating signal F2, which indicates that the carry signal has been emitted during upwards counting. This fine regulating signal F2 corresponds to the sign (up or down count of Z2 associated with the carry signal F2), whereas the fine regulating signal F1 corresponds to the quantity of the count.

Figure 4:
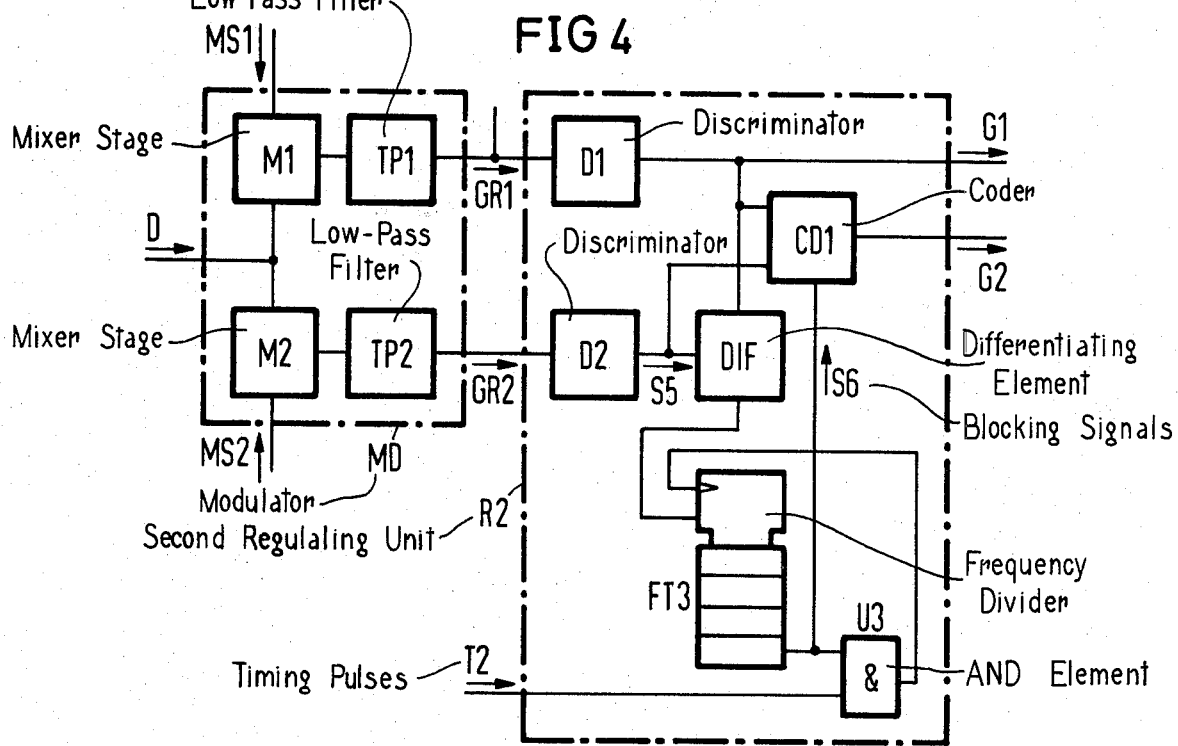
FIG. 4 illustrates a circuit diagram of a modulator and a second regulating unit.

The modulator MD illustrated in FIG. 4 contains two mixer stages M1 and M2 to which the data signals D, the baseband signals, are fed, in each case at a first input. The mixing signals MS1 and MS2 are applied to second inputs. The mixing signals MS1 and MS2 are generated in the regulator RG and they possess repetition frequencies of 5200 Hz and/or 5920. Low-pass filters TP1 and/or TP2, which emit the group signals GR1 and/or GR2, are connected at the output sides of the mixer stages M1 and M2.

The group signals GR1 and GR2 are applied to the regulating unit R2. It contains two discriminators D1 and D2, one coder CD1, one differentiating element DIF, one frequency divider FT3 and one AND element U3. The criterion for the coarse regulation is produced with the assistance of the regulating unit R2. The regulating unit R2 emits coarse regulating signals G1 and G2, which indicate the sign of the frequency error, if, at the same time, its quantity is larger than 15 Hz. The coarse regulating signals G1 and G2 are generated by virtue of the fact that by means of a band pass in each of the discriminators D1 and D2 it is decided whether spectral lines of the group signals drop into the transmission range or not. The transmission ranges of the band passes are arranged in such a way that with each frequency error which is larger than 15 Hz, one of the band passes does not generate a signal. Here, the output signal of the band pass in question determines the sign of the frequency error.

The discriminators D1 and D2 contain in each case one band pass B2 and B3, the center frequency of which is set at 4110 and/or 3570 Hz and which in each case has a band width of 80 Hz. Thus, the transmission ranges of these band passes B2 and B3 are arranged at the upper and lower limits of the frequencies of the group signals from 4160 and/or 3520 Hz. A rectifier is connected at the output side of each band pass which rectifier generates d.c. signals and emits them to a threshold stage. Each threshold stage compares the signal at the output of the rectifier with a threshold value. If the frequencies of the group signals GR1 and GR2 are shifted to such an extent that they exceed the frequency range of 3520 to 4160 Hz by more than 15 Hz, the discriminators D1 and D2 emit signals G1 and/or S5 with the binary value 0. Otherwise, the signals have the binary value 1. Further details of the regulating unit R2 are described together with the diagrams illustrated in FIG. 5.

Figure 5:
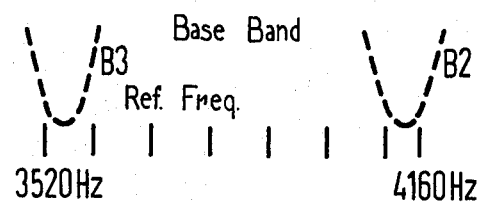
FIG. 5 illustrates a time diagram of signals at different points of the second regulating unit.
Figure 5:
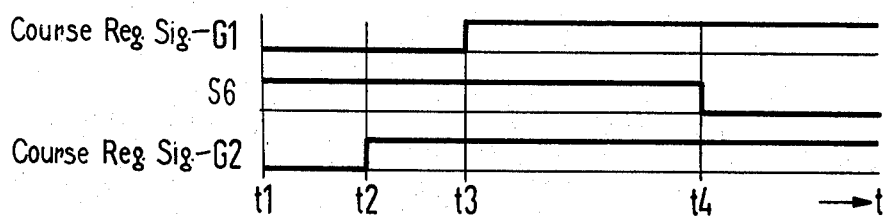
Figure 5:
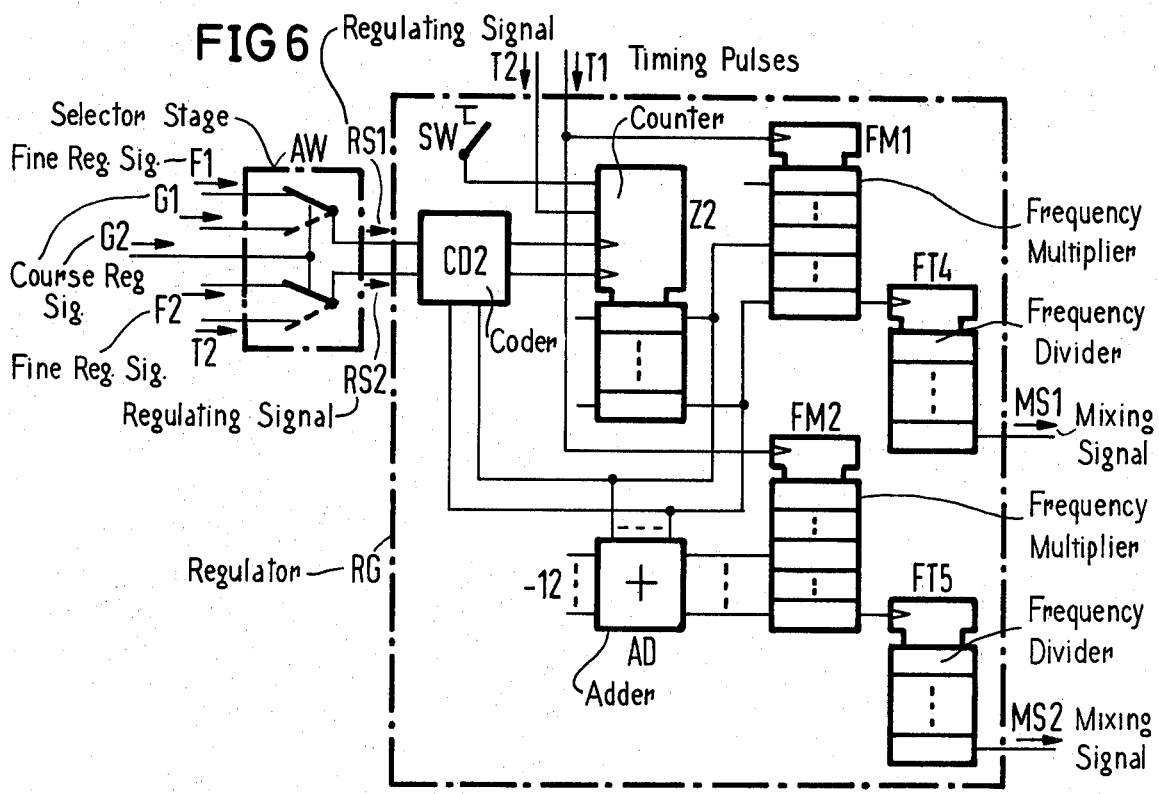

FIG. 5 shows the frequency range of the group signals GR1 and GR2 and the transmission ranges of the band passes B2 and B3 in the discriminators D1 and D2. The coarse regulating signals G1 and G2 as well as a blocking signal S6 are illustrated in the time diagram relating to it.

At the point of time t1, it is assumed that the frequencies of the group signals GR1 are shifted to the left by more than 15 Hz, so that the coarse regulating signal G1 assumes the binary value 0, while the signal S5 has the binary value 1. Furthermore, it is assumed that radio interferences occur. The coarse regulating signals G1 and the signals S5 are fed to the differentiating element DIF, which resets the frequency divider FT3 with each modification of the coarse regulating signals G1 and the signals S5. Counting pulses are applied to the timing input of the frequency divider FT3, which timing pulses are emitted at the output of the AND element U3. At the inputs of the AND element U3, there are applied, on the one hand, the timing pulses T2 having a repetition frequency of, for example, 2.5 Hz and, on the other hand, the blocking signals S6 which are emitted at the output having the highest value. The counting range of the frequency divider FT3 is so developed that the blocking signal S6 assumes the binary value 1 always when within 6 seconds no modification of the coarse regulating signals G1 and of the signals S5 occur. During the radio interference, the blocking signal S6 blocks the coder CD1 and the coarse regulating signal G2 assumes the binary value 0.

At the point of time t2, it is assumed that the radio interference is finished and the blocking signal S6 assumes the binary value 1. The coarse regulating signal G2 thus likewise assumes the binary value 1. During the points of time t2 and t3, the coarse regulating signal G1 has the binary value 0, while the coarse regulating signal G2 has the binary value 1. In this case, a coarse synchronization takes place. Between the points of time t3 and t4, it is assumed that frequencies of the group signals GR1 and GR2 are situated within the transmission range of the band passes B2 and B3, and thus the discriminators D1 and D2 emit, in each case, signals G1 and/or S5 having the binary value 1. In this case, the frequency deviation is smaller than 15 Hz, and no coarse synchronization takes place. Between the points of time t4 and t5, it is assumed that the lower limits of the frequency band of the group signals GR2 are not any longer situated in the transmission range of the band pass B3 and thus the signal S5 has the binary value 0. In this case, such as during the points of time t2 and t3, no coarse regulation takes place.

The selection stage AW illustrated in FIG. 6 contains two switches which are controlled by the coarse regulating signal G2. In the position which is illustrated in a drawn-through fashion, the switches switch through the fine regulating signals F1 and F2 as regulating signals RS1 and RS2 to the regulator RG. In this case, the coarse regulating signal G2 has the binary value 0. When the coarse regulating signal G2 has the binary value 1 and thus indicates that a coarse regulation is being carried out, the coarse regulating signals G1 and the timing pulses T2 are switched through as regulating signals RS1 and/or RS2 to the regulator RG.

The regulator RG contains one coder CD2, one counter Z2, one adder AD, two frequency multipliers FM1 and FM2 and two frequency dividers FT4 and FT5. The frequency multipliers FM1 and FM2 are supplied with timing pulses T1 at the timing inputs.

They divide the repetition frequency of the timing pulses T1 by dividing factors which are determined by signals emitted from the counter Z2 and from the adder AD. Such frequency multipliers are, generally well-known and, for example, each of them can be assembled from three integrated digital units which are available on the market under the designation SN7497. The counter Z2 is in the form of a bidirectional counter and, in dependence upon two counting pulses emitted from the coder CD2, it is counted upwards and downwards. When switching in the circuit arrangement, the counter is set to a value by closing the switch SW, which value is determined in such a way that the mixing signals MS1 and MS2 assume the nominal value of 5200 and/or 5920 Hz. For this purpose, the outputs of the counter Z2 are to be connected to the inputs of an adder AD, which always subtracts the value 12 shown as a binary number, from the count of the counter Z2. The outputs of the adder AD are connected to the inputs of the frequency multiplier FM2. At the output side of the frequency multipliers FM1 and FM2, the frequency dividers FT4 and FT5 having a constant dividing factor of, for example, 512, are connected for the elimination of momentary fluctuations of the repetition frequency of the signals emitted at their outputs. As soon as the circuit arrangement has been switched in, the frequency multipliers FM1 and FM2 show dividing ratios by means of which the repetition frequency of the timing pulses T1 is divided in such a way that, on the one hand, the mixed signals MS1 have the repetition frequency of 5200 Hz and, on the other hand, the mixed signals MS2 have the repetition frequency of 5920 Hz.

In the case of the coarse regulation controlled by the coarse regulating signal G2, the switches in the selection stage AW occupy the position illustrated by a dotted line. In this case, from the regulating signals RS1 and RS2, the coder CD2 generates counting pulses with the repetition frequency of the timing pulses T2, which, in dependence upon the coarse regulating signal G1, count the counter Z2 upwards or downwards. As a result of the altered count of the counter Z2, the frequency multipliers FM1 and FM2 alter the dividing factor, and the repetition frequency of the mixing signals MS1 and MS2 is modified. When no coarse regulation takes place, the coarse regulating signal G2 assumes the binary value 0 and brings the switches in the selection stage AW into the position illustrated in a drawn-through fashion. In this case, the coder CD2 generates counting pulses from the regulating signals RS1 and RS2, which counting pulses, with the repetition frequency of the fine regulating signals F1, count the counter Z2 upwards or downwards. Here, the direction of counting is determined by the fine regulating signal F2.

In order to prevent the repetition frequencies of the mixed signals MS1 and MS2 from exceeding the given limiting values, the outputs of the counter Z2 are connected to the coder CD2. The coder CD2 prevents a generation of counting pulses, if the counts of the counter Z2 exceed or fall below the corresponding limiting values.

The specific construction of the selector stage AW involves the use of simple logic elements to perform the functions discussed. A first AND element connects to F1 and G2. A second AND element connects to G1 and to G2 through an inverter. A third AND element connects to G2 through the inverter and T2. A fourth AND element connects to F2 and G2. The first and second AND elements connect to output the signal RS1 through an OR element and the third and fourth AND elements connect to a second OR element to output the signal RS2.

The coder CD1 utilizes an exclusive OR element receiving signals G1 and S5 and an AND element which outputs signal G2 and is connected to the output of the exclusive OR element and a signal S6.

The coder CD2 has first and second AND elements to which are fed signals which are associated with the frequency limits from counter Z2. These first and second AND elements also respectively connect to third and fourth AND elements. The third AND element receives the signal RS1 and the fourth AND element receives the signal RS1 after passing through an inverter. The outputs of the third and fourth AND elements connect to an OR element which also receives the signal RS2. Fifth and sixth AND elements receive an output from the OR element and also receive the signal RS1 and the signal RS1 after inversion. The outputs of the fifth and sixth AND elements are provided to the counter Z2 which respectively count upwardly and downwardly.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A circuit arrangement for correcting frequency errors occurring during a transmission of data by means of data signals which are modulated according to a frequency-differential phase modulation, comprising a regulating stage means for generating corrected data signals from the data signals, said regulating stage means comprising:
    a modulator means for generating group signals by converting the data signals with mixing signals, said group signals representing the corrected data signals;
    a first regulating unit means for generating fine regulating signals from said group signals if a frequency error of the mixing signals is smaller than a given quantity;
    a second regulating unit means for generating course regulating signals from said group signals if the frequency error is larger than said given quantity;
    a selection stage means for generating regulating signals from either the fine regulating signals or the course regulating signals in dependence upon the magnitude of the frequency error; and
    a regulator means for generating said mixing signals from timing pulses of a given repetition frequency supplied by a timer and in dependence upon the regulating signals which regulate a repetition frequency of the mixing signals.

2. A circuit arrangement for correcting frequency errors occurring during a transmission of data by means of data signals which are modulated according to a frequency differential phase modulation, comprising a regulating stage means for generating corrected data signals from the data signals, said regulating stage means comprising:
    a modulator means for generating group signals by converting the data signals with mixing signals, said group signals representing the corrected data signals;

a first regulating unit means for generating fine regulating signals from said group signals if a frequency error of the mixing signals is smaller than a given quantity;

a second regulating unit means for generating coarse regulating signals from said group signals if the frequency error is larger than said given quantity;

a selection stage means for generating regulating signals from the fine regulating signals or the coarse regulating signals in dependence upon the magnitude of the frequency error;

a regulator means for generating, in dependence upon the regulating signals, said mixing signals from timing pulses of a given repetition frequency supplied by a timer; and said first regulating unit means comprising: a first frequency divider means for dividing a repetition frequency of the group signals by a given factor and which generates measuring signals; a second frequency divider means which is released during a period of time fixed by said measuring signals which divides a repetition frequency of said timing pulses by a given factor and which generates control signals; and a counter means which in dependence upon said control signals is counted upwards or downwards and which generates said fine regulating signals when attaining given values.

3. A circuit arrangement as claimed in claim 2, characterized in that the first regulating unit means comprises a phase detector means which during every change of phase of said group signals resets said first and second frequency divider means.

4. A circuit arrangement for correcting frequency errors occurring during a transmission of data by means of data signals which are modulated according to a frequency-differential phase modulation, comprising a regulating stage means for generating corrected data signals from the data signals, said regulating stage means comprising:

a modulator means for generating group signals by converting the data signals with mixing signals, said group signals representing the corrected data signals;

a first regulating unit means for generating fine regulating signals from said group signals if a frequency error of the mixing signals is smaller than a given quantity;

a second regulating unit means for generating course regulating signals from said group signals if the frequency error is larger than said given quantity;

a selection stage means for generating regulating signals from the fine regulating signals or the coarse regulating signals in dependence upon the magnitude of the frequency error;

a regulator means for generating, in dependence upon the regulating signals, said mixing signals from timing pulses of a given repetition frequency supplied by a timer; and the second regulating unit means comprising: two discriminator means for generating signals having first and/or second binary values ("1" and/or "0") when frequencies of said group signals are situated inside and/or outside a given frequency range; and a coder means for generating said coarse regulating signals from the signals generated by the first and second discriminator means.

5. A circuit arrangement as claimed in claim 4, characterized in that said second regulating unit means comprises: a frequency divider means which is stepped onward by additional timing pulses of low repetition frequency, which is reset with every modification of the signals emitted from said first and second discriminator means, and which emits blocking signals to said coder means.

6. A circuit arrangement for correcting frequency errors occurring during a transmission of data by means of data signals which are modulated according to a frequency-differential phase modulation, comprising a regulating stage means for generating corrected data signals from the data signals, said regulating stage means comprising:

a modulator means for generating group signals by converting the data signals with mixing signals, said group signals representing the corrected data signals;

a first regulating unit means for generating fine regulating signals from said group signals if a frequency error of the mixing signals is smaller than a given quantity;

a second regulating unit means for generating coarse regulating signals from said group signals if the frequency error is larger than said given quantity;

a selection stage means for generating regulating signals from the fine regulating signals or the coarse regulating signals in dependence upon the magnitude of the frequency error;

a regulator means for generating, in dependence upon the regulating signals, said mixing signals from timing pulses of a given repetition frequency supplied by a timer; and said regulator means comprising a first and a second frequency multiplier means which, in dependence upon output signals emitted from a counter, divide said repetition frequency of said timing pulses by variable dividing factors and which generate said mixing signals; said output signals of said counter being fed to said first frequency multiplier means directly and to said second frequency multiplier means via an adder means for subtracting a constant binary number from a binary number represented each time by said output signals; and a coder means which, in dependence upon said regulating signals, counts the counter upwards and downwards.

7. A circuit arrangement as claimed in claim 6, characterized in that a frequency divider means is connected at an output side of said first and second frequency multiplier means which divides the repetition frequencies of said mixing signals each time by a given dividing factor.

8. A circuit arrangement for correcting frequency errors during a transmission of data by means of data signals which are modulated according to a frequency-differential phase modulation, comprising: a regulating stage means having a modulator means for converting the data signals by modulation with mixed signals; a regulator means for generating said mixed signals from timing pulses of given repetition frequency by use of frequency multipliers; said frequency multipliers being controlled by regulating signals which are selectively switched through a selection unit to said regulator means from either a first regulating unit means or a second regulating unit means which derives its signals from the group signals; said first regulating unit means performing a fine regulation and said second regulating unit means performing a coarse regulation for correction of the frequency errors of the data signals.

* * * * *